Aug. 10, 1954  A. T. SULLIVAN  2,685,799
MECHANICAL THERMOMETER SHAKER
Filed Feb. 12, 1952

INVENTOR.
ALLEN T. SULLIVAN
BY
Gerald P. Welch
ATTORNEY

Patented Aug. 10, 1954

2,685,799

UNITED STATES PATENT OFFICE 2,685,799

MECHANICAL THERMOMETER SHAKER

Allen T. Sullivan, Milwaukee, Wis.

Application February 12, 1952, Serial No. 271,260

2 Claims. (Cl. 73—373)

This invention relates to improvements in thermometer shakers, and more particularly to a novel electrical thermometer shaker.

An object of the invention is to provide a device of the type which will by mechanical means shake down the mercury in a plurality of thermometers placed therein.

Another object of the invention is to provide a device of the type which will utilize centrifugal force in shaking down the mercury in a plurality of thermometers placed therein in a minimum amount of time.

Other and further objects of the invention will appear as the description proceeds, reference being had to the accompanying drawings, in which.

Figure 1:
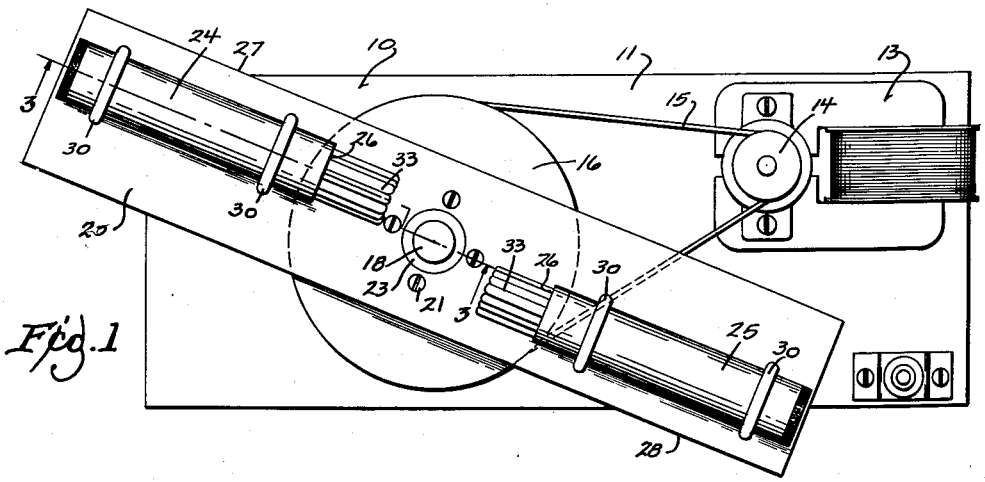
Fig. 1 is a plan view of a centrifugal thermometer shaker embodying the invention.
Figure 2:
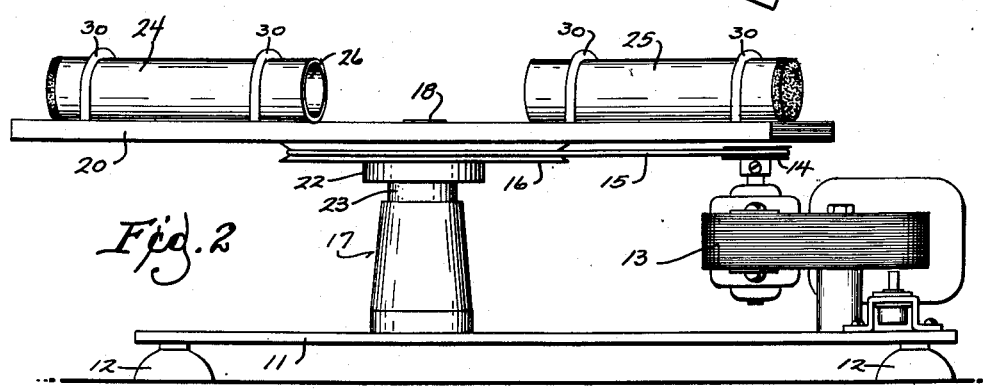
Fig. 2 is a side view in elevation of the same.
Figure 3:
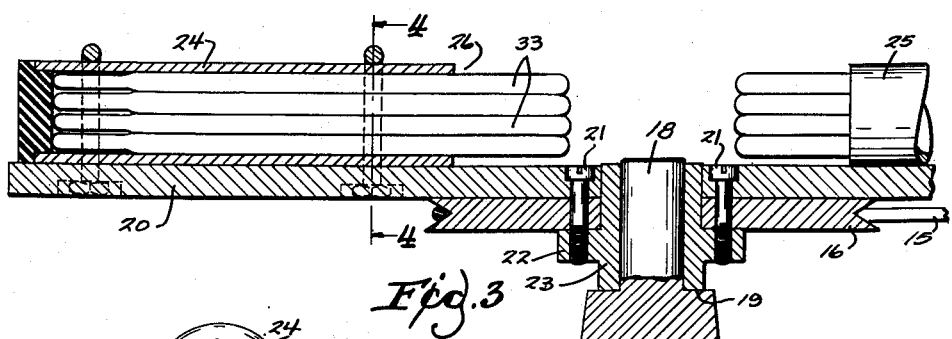
Fig. 3 is a view in vertical section of the device.
Figure 4:
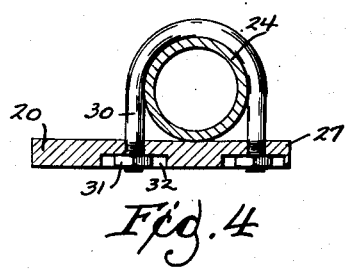
Fig. 4 is a view taken on line 4—4 of Fig. 3.

Referring more particularly to the drawings, the numeral 10 refers to the device generally, having a base 11 mounted on the resilient feet 12. An electric motor 13 of 1/250 horsepower is attached to the base 11 adjacent one end thereof and has the horizontal pulley 14 thereon coupled by the rubber band 15 to a relatively larger horizontal pulley 16. A bearing standard 17 is affixed by a central threaded means 18a to the base 11 and is topped by a vertical axle 18 and the shoulder 19.

An elongated rectangular plate 20 is fixed by the threaded means 21 to the subjoined pulley 16 and the flange 22 of the bushing 23 which is received for rotation on the axle 18 and rests freely on the shoulder 19. A pair of tubular receptacles 24 and 25 are carried on the upper surface of the rectangular plate 20 and are disposed with their open ends 26 directed inwardly of the device. The receptacles 24 and 25 are fixed adjacent the outer ends of plate 20 parallel to the side edges 27 and 28 thereof, one on each side of a longitudinal median line of said plate to give a whip action during rotation thereof.

The receptacles 24 and 25 may be flattened on their lower sides and affixed by a permanent adhesive means to the plate 20. In the form illustrated, a pair of rod straps 30 embrace each receptacle 24 and 25 securing the latter to the plate 20 by threaded means 31 within recesses in the lower surface of plate 20 as at 32 thereof.

In use, a plurality of thermometers 33 are placed within the receptacles 24 and 25. The motor 13 is then energized, whereupon the plate 20 will rotate at approximately 600 revolutions per minute, causing the mercury within the thermometers 33 to be shaken down as desired in a minimum lapse of time.

It will be understood that the device is capable of many modifications in structure and design, without departing from the spirit of the invention, within the scope of the appended claims.

Having thus described the invention, what is claimed and desired to be secured by Letters Patent of the United States, is:

1. A mechanical thermometer shaker including a base, a vertical bearing standard fixed on said base, a vertical axle surmounting said standard, a pulley mounted for horizontal rotation on said axle, an elongated plate fixed horizontally to the upper side of said pulley, and a pair of tubular thermometer receptacles affixed to said plate parallel with the longitudinal edges thereof and spaced exteriorly one on each side of the median longitudinal line of said plate at opposite ends thereof.

2. A mechanical thermometer shaker including a base, a vertical bearing standard affixed to said base, a reduced axle portion at the top thereof, a shoulder at the base of said axle portion, a vertically bored bushing engaged on said axle, a horizontal flange on said bushing adapted to bear freely on said shoulder, a pulley horizontally disposed and fixed to said bushing, an elongated rectangular plate fixed to the top of said pulley and to the bushing, and a pair of tubular thermometer receptacles fixed to the top side of said plate parallel with the longitudinal edges thereof and spaced exteriorly one on each side of the median longitudinal line of said plate at opposite ends thereof, the open ends of said receptacle tubes being directed toward the axis of rotation.

References Cited in the file of this patent

UNITED STATES PATENTS

| Number | Name | Date |
|---|---|---|
| 2,179,839 | Brosnan | Nov. 14, 1939 |
| 2,269,859 | Owen | Jan. 13, 1942 |